J. GORDON, Jr.
AERIAL PHOTOGRAPHIC APPARATUS.
APPLICATION FILED OCT. 11, 1920.
1,372,746.
Patented Mar. 29, 1921.
2 SHEETS—SHEET 1.
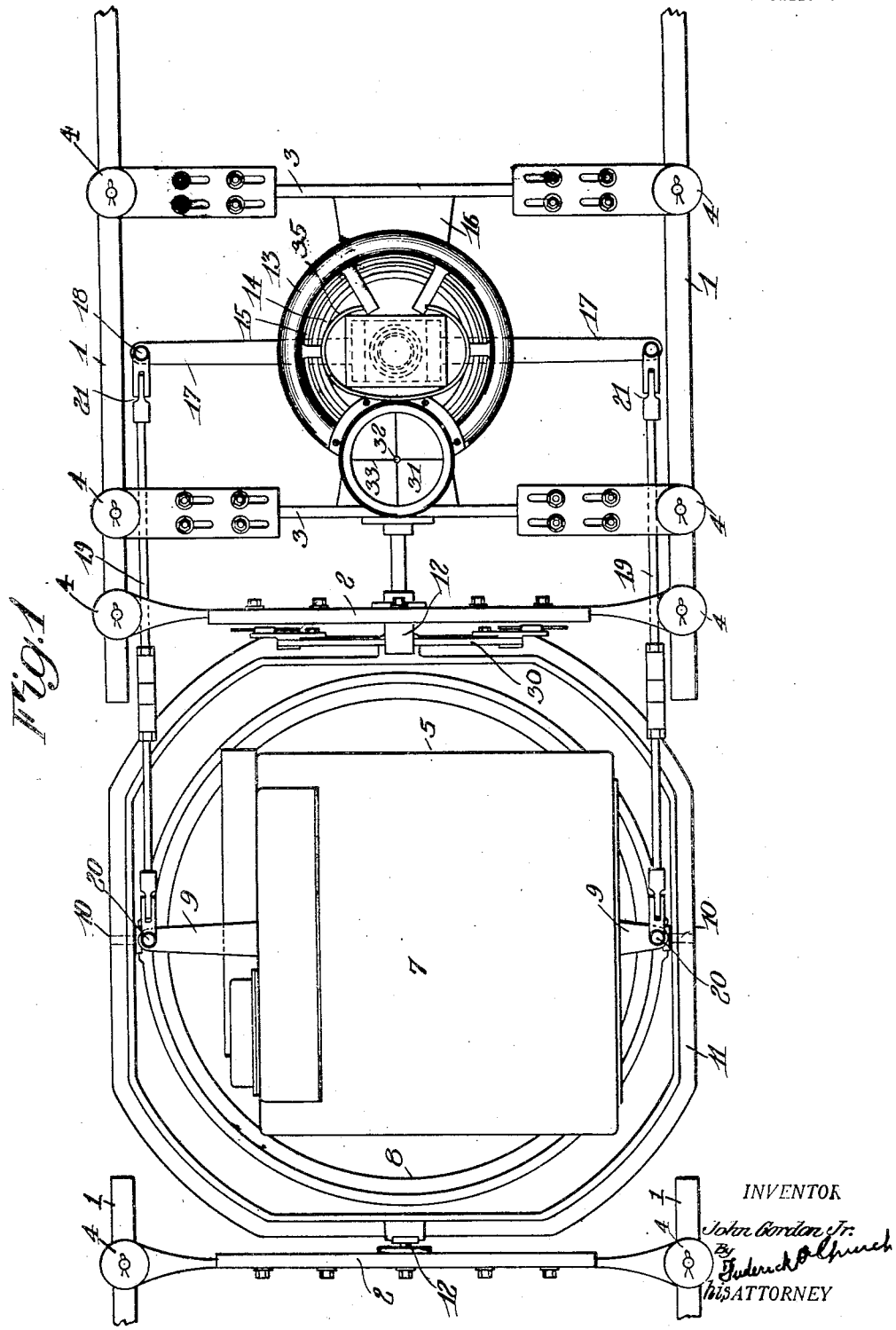
INVENTOR
John Gordon Jr.
By
Frederick A. Church
his ATTORNEY J. GORDON, Jr.
AERIAL PHOTOGRAPHIC APPARATUS.
APPLICATION FILED OCT. 11, 1920.
1,372,746.
Patented Mar. 29, 1921.
2 SHEETS—SHEET 2.
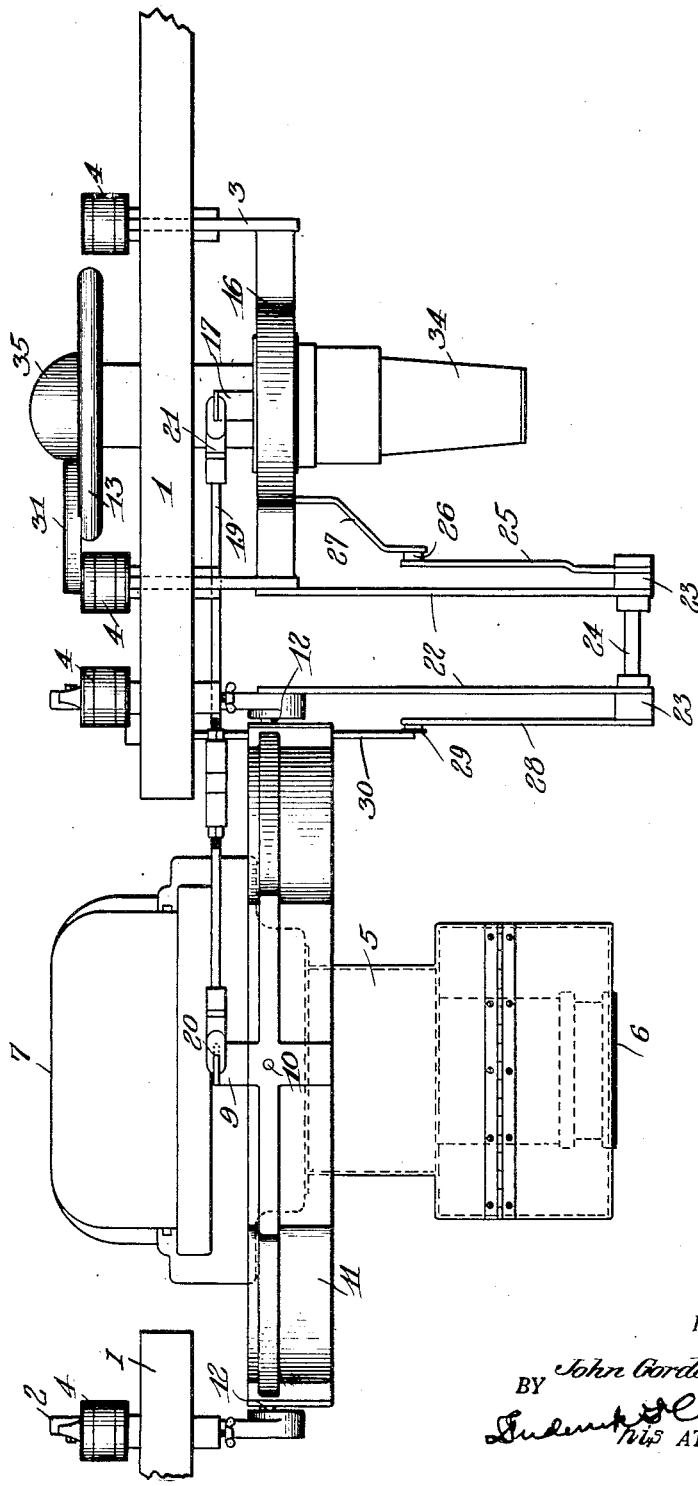
INVENTOR
John Gordon Jr.
BY
ATTORNEY

UNITED STATES PATENT OFFICE.

JOHN GORDON, JR., OF ROCHESTER, NEW YORK, ASSIGNOR TO EASTMAN KODAK COMPANY, OF ROCHESTER, NEW YORK, A CORPORATION OF NEW YORK.

AERIAL PHOTOGRAPHIC APPARATUS.

1,372,746.  Specification of Letters Patent.  Patented Mar. 29, 1921.

Application filed October 11, 1920. Serial No. 416,014.

*To all whom it may concern:*

Be it known that I, JOHN GORDON, Jr., of Rochester, in the county of Monroe and State of New York, have invented certain new and useful Improvements in Aerial Photographic Apparatus; and I do hereby declare the following to be a full, clear, and exact description of the same, reference being had to the accompanying drawings, forming a part of this specification, and to the reference-numerals marked thereon.

My present invention relates to photography and more particularly to aerial photography and to the construction of cameras for use in airplanes to photograph the ground beneath and the invention has for its object to provide means in a camera of this character whereby the operator may learn instantly from his position at the controlling mechanism remote from the camera the true position of the axis of the lens with reference to the horizontal. To these and other ends the invention resides in certain improvements and combinations of parts, all as will be hereinafter more fully described, the novel features being pointed out in the claims at the end of the specification.

In the drawings:

Figure 1 is a top plan view of an aerial camera provided with a controlling device and indicator constructed in accordance with and illustrating one embodiment of my invention;

Fig. 2 is a side view thereof, the ends of the holding frame being broken away in both views.

Similar reference numerals throughout the several views indicate the same parts.

In the particular camera herein shown, 1 indicates the side rails of a carrying frame on the airplane and 2 and 3 cross rails supported thereon through the medium of cushioning devices 4, the said cross rails bearing the weight of all of the mechanism hereinafter described. The camera body is indicated generally at 5, the downwardly disposed lens portion being shown at 6 in Fig. 2 and the back or top at 7 in Fig. 1. It is supported within an annular frame 8 by lateral arms 9 that rotate on the said frame about the optical axis of the camera to change the position of the image in the focal plane without changing the view. The frame 8 in turn is pivoted on a transverse axis to tilt in a vertical plane on trunnions 10 extending therefrom into an encircling frame 11. The frame 11 is fitted with trunnions 12 having bearings in the cross rails 2 so that it may tilt in a vertical plane transverse to that of the frame 8. In this way, it will be understood, the camera is permitted a substantially universal movement in which its optical axis may be inclined in any direction or, rather, may be inclined relatively to the frame 1 to maintain itself vertical through the frame, due to the movements of the plane, be off of the horizontal.

The operating member for the controlling mechanism for thus positioning the camera is in the form of a wheel 13 mounted on inner and outer rings 14 and 15 in the same manner that the camera is mounted on the frames 8 and 11, that is, the wheel 13 rotates on the inner ring 14 that is transversely pivoted to the outer ring 15 while the latter is longitudinally pivoted in a supporting frame 16 extending between the cross rails 3. Laterally extending arms 17 fixed to the wheel 13 have pivoted to them at 18 pull rods 19 the opposite ends of which are pivoted at 20 to the lateral arms 9 of the camera so that rotary movements of the wheel 13 are communicated in the same degree and kind to the camera 5. The rods 19 are additionally jointed at 21 on horizontal pivots to allow for the tilting movements of the connected parts above explained.

Depending from the center cross rails 2 and 3 on the center line of the camera 5 and operating wheel 13 are a pair of bracket arms 22 carrying bearings 23 at their lower ends in which is journaled a rock shaft 24. Fixed to one end of this rock shaft is an arm 25 pivoted at 26 to a depending arm 27 on the outer floating frame 15 of the operating wheel 13 and fixed to the other end of the rock shaft is a similar arm 28 pivoted at 29 to a depending arm 30 on the outer frame 11 of the camera support. It will be seen from this that when the operating wheel 13 is pressed to the right or left, tilting its supporting frame or ring 15 correspondingly, the motion will be communicated in the same direction and to the same degree to the camera frame 11 and the camera itself. Tilting the wheel 13 longitudinally of the frame 1 causes frame 14 to rock within frame 15 on a transverse axis and as the pull or thrust on rods 19 will then be equal and the rods are connected at points offset from the pivots of the frames 14 and 8, it will cause the latter to tilt in the same direction and to the same degree as the ring 14 and the vertical axis of the wheel 13. In other words, in all its movements, both rotary and tilting, the wheel 13 is followed correspondingly by the camera 5. Therefore, I place upon the wheel 13 a spirit level 31 of the spherical type, the bubble being shown at 32 and the cross hairs at 33. The operator's seat is on the opposite side of the wheel from the camera and remote from the latter but by watching the spirit level on the wheel, he can determine the position of his camera and the axis of its lens and thereby bring it to a vertical position when the airplane and frame 1 fixed thereto are tilted, as in banking against a wind.

The level 31 also comes adjacent to the focusing devices or, at least, the view finding devices that the operator uses and which are arranged axially of the wheel 13. The lens tube thereof is shown at 34 and the eyepiece at 35 but this structure has nothing to do with the present invention.

I claim as my invention:

1. In an aerial photographic apparatus, the combination with a horizontal frame and a universally movable camera mounted therein with the axis of its lens vertically disposed, said camera being adapted to rock in two vertical planes normal to each other, of controlling mechanism connected to said camera and by means of which its position may be shifted and a universal spirit level mounted upon an element of the controlling mechanism and having its zero position correlated with the vertical position of the axis of the camera lens.

2. In an aerial photographic apparatus, the combination with a horizontal frame and a universally movable camera mounted therein with the axis of its lens vertically disposed, said camera being adapted to rock in two vertical planes normal to each other, of controlling mechanism connected to said camera and by means of which its position may be shifted, such controlling mechanism embodying a horizontal hand wheel, and a universal spirit level mounted upon the hand wheel and having its zero position correlated with the vertical position of the axis of the camera lens.

JOHN GORDON, Jr.